(12) United States Patent
Lejawka et al.

(10) Patent No.: US 8,921,701 B2
(45) Date of Patent: Dec. 30, 2014

(54) MODULAR INSULATOR FOR BUSBAR SUPPORT AND METHOD OF ASSEMBLING

(75) Inventors: Maciej Bartosz Lejawka, Bielsko-Biala (PL); Jacek Waclaw Nurzynski, Pszczyna (PL); Dharamveer Surya Prakash Bathla, Secunderabad (IN)

(73) Assignee: General Electric Copany, Schenectady, NY (US)

( * ) Notice: Subject to any disclaimer, the term of this patent is extended or adjusted under 35 U.S.C. 154(b) by 296 days.

(21) Appl. No.: 13/602,605

(22) Filed: Sep. 4, 2012

(65) Prior Publication Data

US 2014/0060890 A1  Mar. 6, 2014

(51) Int. Cl.
*H01B 17/16* (2006.01)
*H05K 3/10* (2006.01)

(52) U.S. Cl.
USPC ......................................... 174/163 R; 29/850

(58) Field of Classification Search
USPC ......................................... 174/163 R; 29/850
See application file for complete search history.

(56) References Cited

U.S. PATENT DOCUMENTS

| | | | |
|---|---|---|---|
| 3,961,129 A | 6/1976 | Gehrs et al. | |
| 5,316,490 A | 5/1994 | Clemence et al. | |
| 5,854,445 A | 12/1998 | Graham et al. | |
| 6,196,869 B1 | 3/2001 | Kay et al. | |
| 6,288,338 B1 | 9/2001 | Kauffman et al. | |
| 6,473,294 B1 | 10/2002 | Maier | |
| 6,603,075 B1 | 8/2003 | Soares et al. | |
| 6,781,818 B2 | 8/2004 | Josten et al. | |
| 6,865,073 B2 | 3/2005 | Werner et al. | |

FOREIGN PATENT DOCUMENTS

| | | |
|---|---|---|
| EP | 0428055 A2 | 5/1991 |
| GB | 1130181 | 10/1968 |
| GB | 1330512 | 9/1973 |
| GB | 2305008 A | 3/1997 |
| WO | 2011040908 A1 | 4/2011 |
| WO | 2011048260 A1 | 4/2011 |

*Primary Examiner* — Timothy Thompson
*Assistant Examiner* — Charles Pizzuto
(74) *Attorney, Agent, or Firm* — General Electric Company

(57) ABSTRACT

A modular insulator for an electrical conductor is provided. The modular insulator includes a first end member configured to couple to a support rail of an electrical power distribution system and a second end member configured to couple to the support rail. The modular insulator further includes at least one intermediate member comprising a groove and configured to releasably couple to at least one of the first and second end members such that the intermediate member is positioned between the first and second end members. The groove is configured to receive a portion of the electrical conductor.

20 Claims, 3 Drawing Sheets

MODULAR INSULATOR FOR BUSBAR SUPPORT AND METHOD OF ASSEMBLING

BACKGROUND OF THE INVENTION

The field of the invention relates generally to the field of electrical power distribution, and more specifically to busbar support systems.

The distribution of electrical power is typically managed using distribution enclosures, such as load centers, panelboards, switchgear, and the like. The distribution enclosures provide electricity to a load, such as machines and motors. Switchgear, for example, typically include one or more electrical busbars that enable current to flow to the load.

Conventionally, electrical busbars are relatively heavy conductive strips disposed to conduct electricity within a switchboard, distribution station, or other electrical system or apparatus. In some applications, layers of busbars may be stacked. If an electrical short occurs, magnetic repulsion forces generated by the short may act to separate the stack, thereby causing stresses upon the stack of busbars and the system. Furthermore, the weight of the stack within an electrical system may be difficult to support.

BRIEF DESCRIPTION OF THE INVENTION

In one embodiment, a modular insulator for an electrical conductor supported by a support rail of an electrical power distribution system is provided. The modular insulator includes a first end member configured to couple to the support rail and a second end member configured to couple to the support rail. The modular insulator further includes at least one intermediate member comprising a groove and configured to releasably couple to at least one of the first and second end members such that the intermediate member is positioned between the first and second end members. The intermediate member is configured to receive a portion of the electrical conductor within the groove.

In another embodiment, an electrical conductor support system is provided. The electrical conductor support system includes a first electrical conductor, a first support rail and a first conductor support coupled to the first support rail. The first conductor support includes a first end member, a second end member, and a first modular member coupled therebetween. The system further includes a second support rail substantially parallel to the first support rail and a second conductor support coupled to the second support rail and positioned opposite to the first conductor support. The second conductor support includes a third end member, a fourth end member, and a second modular member coupled therebetween. Each of the first and second modular members include a groove configured to receive a portion of the electrical conductor and the electrical conductor is secured within the grooves between the first and second modular members.

In yet another embodiment, a method of assembling an electrical conductor support system is described. The method of assembling includes providing opposed first and second support rails, providing a plurality of end members, and providing a plurality of modular members having a groove formed therein. The method further includes coupling a pair of end members to each of the first and second support rails such that each pair of end members is opposed, and coupling at least one modular member of the plurality of modular members between each pair of end members to provide a pair of opposite modular members, the grooves of each modular member being substantially aligned. The method further includes positioning an electrical conductor in each groove of the pair of opposed modular members to support the electrical conductor.

DETAILED DESCRIPTION OF THE INVENTION

Figure 1:
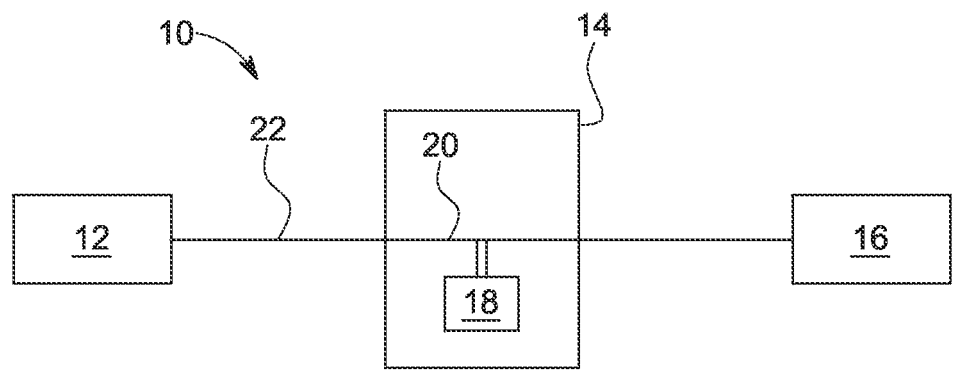
FIG. 1 is schematic view of an exemplary power distribution system.

FIG. 1 illustrates an exemplary power distribution system 10 that generally comprises an electrical power source 12, a distribution enclosure 14 to distribute electric power to a load 16, a circuit protection device 18 and one or more electrical conductors 20 such as, for example, a busbar.

Figure 2:
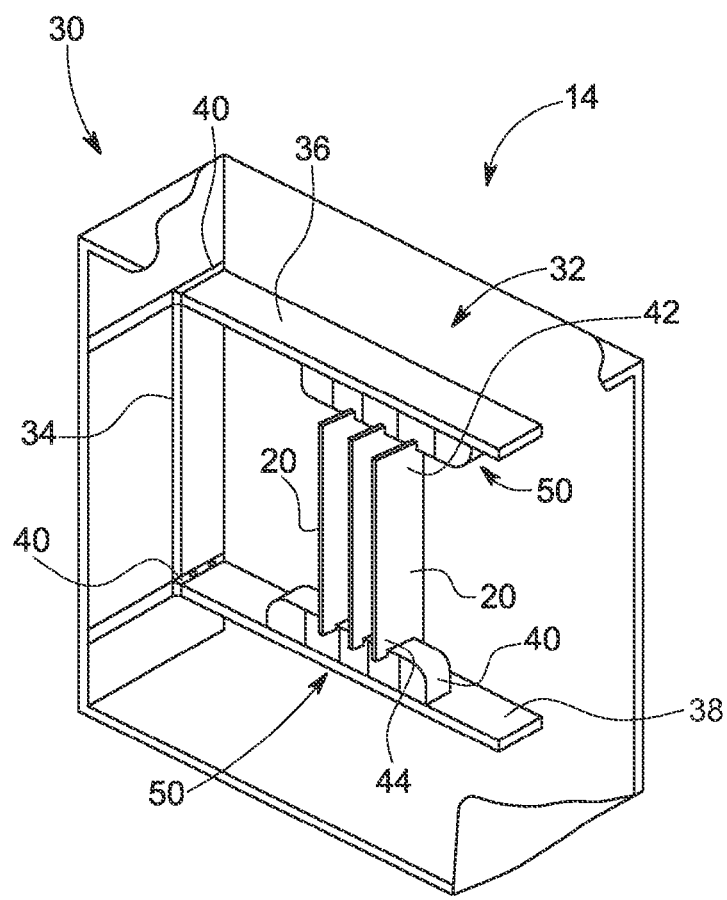
FIG. 2 is an isometric view of the exemplary power distribution system of FIG. 1.

Load 16 may include, for example, machinery, motors, lighting, and/or other electrical and mechanical equipment of a manufacturing or power generation or distribution facility. Distribution enclosure 14 may be, for example, a switchgear unit 14 (FIG. 2). Power is provided to switchgear unit 14 through an electrical distribution line 22, which is coupled to one or more busbars 20 within switchgear unit 14. Busbars 20 are also coupled to circuit protection device 18 such that circuit protection device 18 may selectably enable or disable current from flowing through busbars 20 and electrical distribution line 22 to one or more loads 16. Busbars 20 are manufactured from an electrically conductive material, such as copper or any other suitable material to enable current to flow through busbars 20 from electrical power source 12 to one or more loads 16.

FIG. 2 illustrates switchgear distribution enclosure 14. Switchgear 14 generally comprises a housing 30 and an electrical conductor support system 32 to support one or more busbars 20. In the exemplary embodiment, housing 30 includes a support framework 34 for protecting and/or supporting components of switchgear unit 14. Housing 30 and/or support framework 34 is manufactured from metal and/or a metal alloy, such as steel. Alternatively, housing 30 and/or support framework 34 may be manufactured from any other material that enables housing 30 to function as described herein.

In the exemplary embodiment, busbars 20 carry and distribute the primary current of power distribution system 10. FIG. 2 depicts power distribution system 10 having three busbars 20, which form one phase of a three-phase electrical distribution circuit (not shown). However, any suitable number of busbars 20 and/or phases may be used that enable the system to operate as described herein. Similarly, although busbars 20 are depicted in a vertical arrangement, busbars 20 may also be arranged horizontally. In addition, each busbar phase may include a single busbar segment 20 or may include a plurality of busbar segments 20. The number of busbar segments 20 may be selected based on the amount of current capacity desired for the busbar phase. Moreover, in the exemplary embodiment, conductor support system 32 supports a single phase. Alternatively, any number of phases may be supported by conductor support system 32.

In the exemplary embodiment, busbars 20 are held in fixed relation with each other via conductor support system 32. Generally, conductor support system 32 comprises first and second supporting members or rails 36 and 38, and modular insulators 50. First and second support rails 36 and 38 are coupled to housing 30 and/or support framework 34 using suitable hardware 40. In the exemplary embodiment, insulators 50 are coupled to first and second support rails 36 and 38 using suitable hardware 40. As used herein, suitable hardware means any combination of nuts, bolts, washers, screws, self tapping screws, welds, or any other suitable means for fastening the respective parts together for the purpose disclosed herein. In the exemplary embodiment, each busbar 20 includes a first end 42 and a second end 44. Each first end 42 is engaged and supported by an insulator 50 coupled to first support rail 36, and each corresponding second end 44 is engaged and supported by an insulator 50 coupled to second rail 38. Thus, conductor support system 32 separates and supports each busbar 20.

Figure 3:
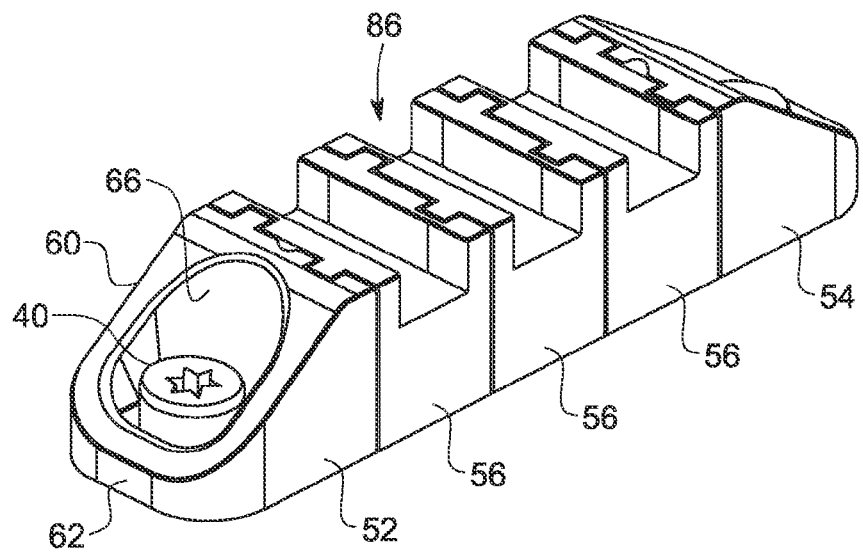
FIG. 3 is a perspective view of an exemplary modular insulator of the power distribution system shown in FIG. 2.
Figure 4:
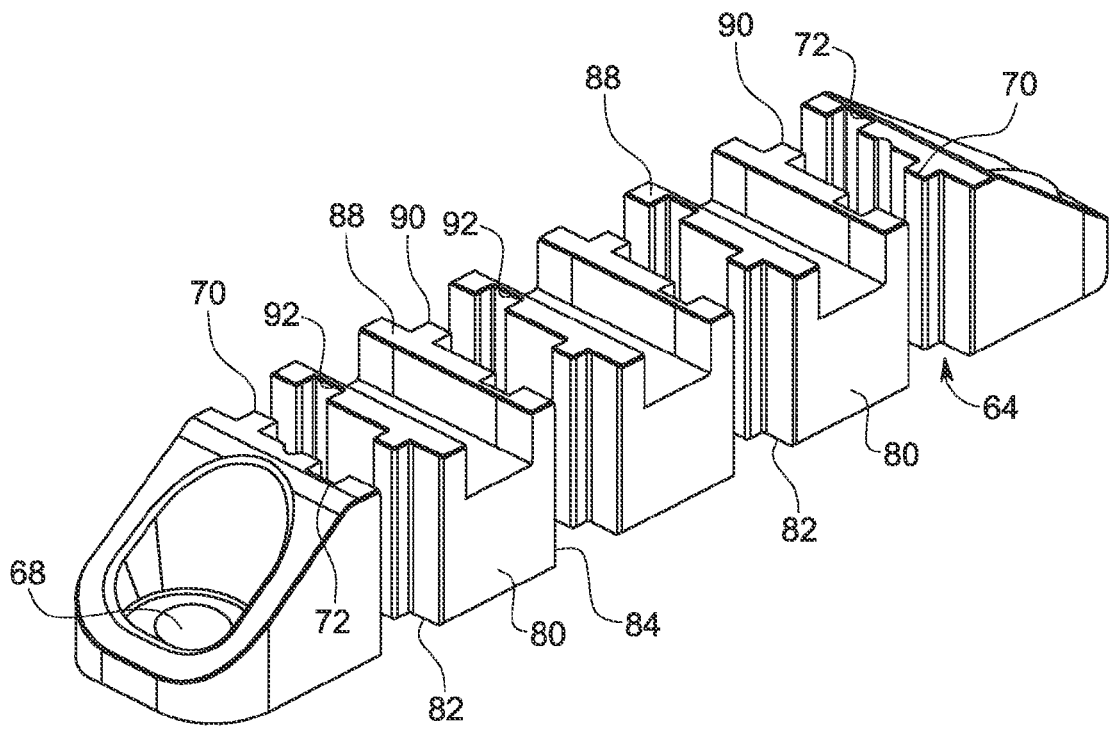
FIG. 4 is a perspective view of the modular insulator shown in FIG. 3 disassembled.
Figure 5:
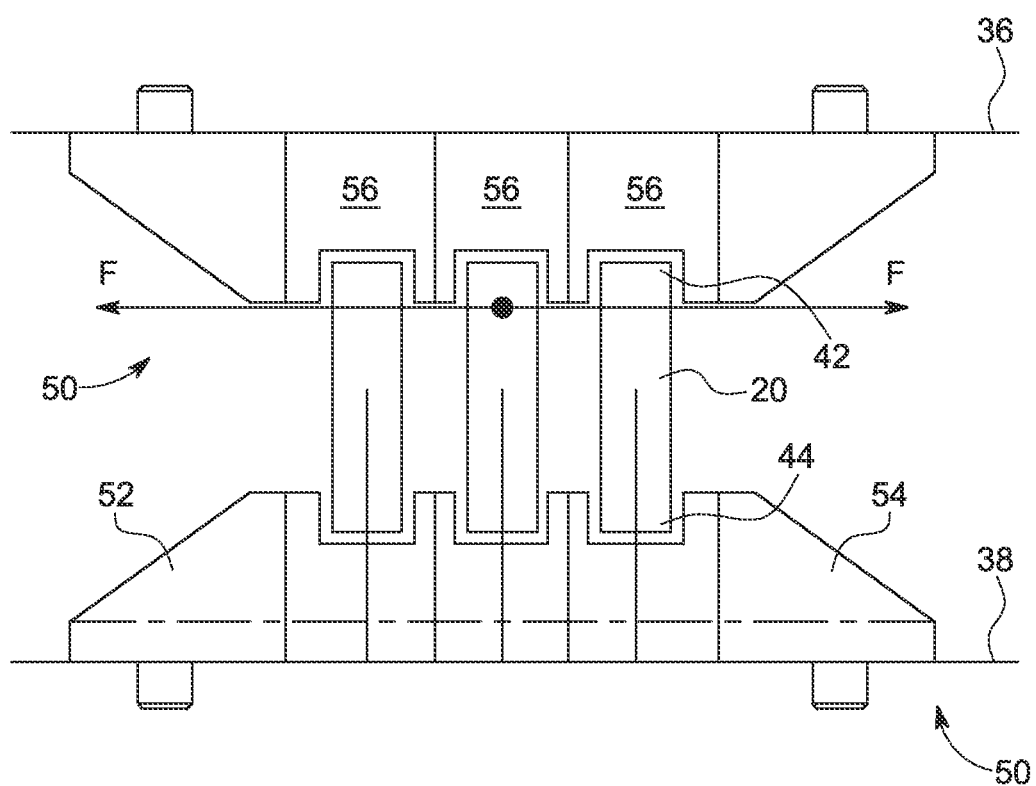
FIG. 5 is a side view of a busbar support system of the power distribution system shown in FIG. 2.

FIGS. 3 and 4 respectively illustrate an exemplary assembled and disassembled embodiment of modular insulator 50. Modular insulator 50 generally comprises a first end member 52, a second end member 54 and one or more intermediate or modular members 56. In the exemplary embodiment, three modular members 56 are positioned between end members 52 and 54. Alternatively, any number of modular members 56 is positioned between end members 52 and 54. In the exemplary embodiment, first and second end members 52 and 54 each comprise a body 60, a base 62, a sidewall 64, an inner edge 66 and an aperture 68 extending through base 62. Hardware 40 is inserted within inner edge 66 and aperture 68 to couple base 62 to one of support rails 36 and 38 (FIG. 5).

In the exemplary embodiment, body 60 is angled, which facilitates reducing cost and material used to fabricate first end members 52 and 54. However, body 60 may be any suitable shape that enables end members 52 and 54 to function as described herein. In the exemplary embodiment, each end member 52 and 54 and each modular member 56 is substantially identical to one another to provide a modular function. Further, end members 52 and 54 and modular member 56 are fabricated from molded plastic. In an alternative embodiment, any suitable material may be used enabling end members 52 and 54 and modular member 56 to function as described herein.

As illustrated in FIG. 4, each sidewall 64 of first and second end members 52 and 54 includes a projection 70, and a recess 72. In the exemplary embodiment, projection 70 is configured to mate with a corresponding recess 92 of modular member 56, as will be described below. Similarly, recess 72 is configured to mate with a corresponding projection 90 of modular member 56. Although sidewall 64 is described as having a single projection 70 and recess 72, sidewall 64 may have any number of projections 70 and recesses 72 that enable end members 52 and 54 to function as described herein.

In the exemplary embodiment, modular member 56 comprises a generally rectangular body 80, a first sidewall 82, a second sidewall 84 and a groove 86 defined by a top surface 88 of body 80. Body 80, as depicted in FIG. 4, is generally rectangular. In alternative embodiments, body 80 may have any shape that enables modular member 56 to function as described herein. Groove 86 is generally parallel to opposed first and second sidewalls 82 and 84. In the exemplary embodiment, groove 86 receives an end portion 42 or 44 of busbar 20 to support it between sidewalls 82 and 84, thereby preventing movement of busbar 20 and preventing contact with adjacent busbars 20 or other objects contained in switchgear unit 14. Groove 86 also secures busbar 20 during a short circuit event to resist magnetic repulsion forces F.

In the exemplary embodiment, first and second sidewalls 82 and 84 of modular member 56 each include a projection 90 and a recess 92. The orientation of projection 90 and recess 92 on first sidewall 82 is a complementary shape on second sidewall 84 such that modular member 56 is in the same shape when rotated 180°. The complementary shape on second sidewall 84 enables the projection 90 and recess 92 on second sidewall 84 to mate with a corresponding recess 92 and projection 90 of a first sidewall 82 of an adjacent modular member 56, as illustrated in FIG. 3. Similarly, projections 90 and recesses 92 of sidewalls 82 and 84 mate with corresponding recesses 72 and projections 70 of end members 52 and 54. Thus, adjacent modular members 56 slide together vertically and cannot be pulled apart horizontally.

Thus, in the exemplary embodiment, first sidewall 82 may matingly engage any of sidewalls 64, second sidewall 84, or even another first sidewall 82 to couple the engaged sidewalls. Similarly, second sidewall 84 may matingly engage any of sidewalls 64, first sidewall 82, or even another second sidewall 84. In the exemplary embodiment, projections 70 and 90 corresponding recesses 72 and 92 are dovetail joints that securely couple modular member 56 to any of first end member 52, second end member 54, or another modular member 56. In alternative embodiments, projections 70 and 90 snap-fit to corresponding recesses 72 and 92. Although sidewalls 82 and 84 are described as each having a single projection 90 and recess 92, sidewalls 82 and 84 may have any number of projections 90 and recesses 92 that enables modular member 56 to function as described herein. Further, projections 70 and 90 may have any shape that enable them to engage or couple to recesses 72 and 92, and vice versa.

During assembly, any number of modular members 56 is provided to support a corresponding number of busbars 20. A pair of end members 52 and 54 is also provided for each of first and second support rails 36 and 38. Modular members 56 are coupled to any of first end member 52, second end member 54, and an adjacent modular member 56 to provide any desired configuration or number of grooves 86 to receive busbars 20. Hardware 40 couples end members 52 and end members 54 to either of support rails 36 and 38. Thus, end members 52 and 54 and modular member(s) 56 are coupled together to form modular insulator 50. Although the figures illustrate modular insulator 50 comprising three adjacent modular members 56, it should be noted that any number of modular members 56 may be provided that enables modular insulator 50 to function as described herein.

FIG. 5 illustrates an exemplary assembled electric conductor support system 32. A first modular insulator 50 is coupled to first support rail 36 and a second modular insulator 50 is coupled to second support rail 38 opposite the first modular insulator 50. Each of first and second modular insulators 50 comprises three modular members 56 coupled between end members 52 and 54. Grooves 86 of first modular insulator modular members 56 are opposite to and aligned with grooves 86 of opposed second modular insulator modular members 56. Opposed modular members 56 of first modular insulator 50 and second modular insulator 50 receive busbars 20 within corresponding grooves 86 to secure busbars 20 therein. Once secured within grooves 86, each busbar 20 is insulated from adjacent busbars 20 and other components within switchgear unit 14.

As described above, modular insulator 50 is formed from only two different types of interconnecting members, namely an end member 52 and 54 and an intermediate modular member 56. Any number of modular members 56 may be added or removed from modular insulator to provide a desired configuration and to provide busbar support in distribution enclosures having any number of busbars and busbar configurations. Fabricating only two different members simplifies manufacturing and reduces cost as well as increases ease of assembly. Thus, the modular characteristic of the disclosed insulator provides an insulator that can be installed in nearly any power distribution system having electrical conductors.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A modular insulator for an electrical conductor supported by a support rail of an electrical power distribution system, said modular insulator comprising:
    a first end member configured to couple to the support rail;
    a second end member configured to couple to the support rail; and
    at least one intermediate member comprising a groove and configured to releasably couple to at least one of said first and second end members such that said intermediate member is positioned between said first and second end members, wherein said intermediate member is configured to receive a portion of the electrical conductor within the groove.

2. The modular insulator of claim 1, wherein said first and second end members are substantially identical.

3. The modular insulator of claim 1, further comprising at least two intermediate members, wherein a first intermediate member is coupled to said first end member and a second intermediate member is coupled to said second end member.

4. The modular insulator of claim 3, wherein said first intermediate member is coupled to said second intermediate member such that said first and second intermediate members are positioned between said first and second end members.

5. The modular insulator of claim 1, further comprising at least three intermediate members, wherein a first intermediate member is coupled to said first end member, a second intermediate member is coupled to said second end member, and a third intermediate member is coupled to said first and second intermediate members such that said third intermediate member is positioned between said first and second intermediate members, and wherein said first and second intermediate members are positioned between said first and second end members.

6. The modular insulator of claim 5, wherein said intermediate members are substantially identical.

7. The modular insulator of claim 1, wherein said first and second end members each comprise a sidewall including a projection and a recess.

8. The modular insulator of claim 7, wherein said intermediate member comprises a first sidewall including a projection and a recess, and wherein said projection of said intermediate member is configured to operatively mate with said recess of either of said first and second end members and said recess of said intermediate member is configured to operatively mate with said projection of either of said first and second end members.

9. The modular insulator of claim 8, wherein said intermediate member further comprises a second sidewall including a projection and a recess, said second sidewall opposed to said first sidewall, wherein said first sidewall is configured to operatively mate with said first end member sidewall and said second sidewall is configured to operatively mate with said second end member sidewall.

10. The modular insulator of claim 1, wherein said first and second end members and said intermediate member are molded plastic.

11. The modular insulator of claim 1, further comprising a plurality of substantially identical intermediate members, said first and second-end members being substantially identical, wherein said plurality of intermediate members are each modular and are configured to operatively couple between said first and second end members.

12. An electrical conductor support system comprising:
    a first electrical conductor;
    a first support rail;
    a first conductor support coupled to said first support rail, said first conductor support comprising a first end member, a second end member, and a first modular member coupled therebetween;
    a second support rail substantially parallel to said first support rail; and
    a second conductor support coupled to said second support rail and positioned opposite said first conductor support, said second conductor support comprising a third end member, a fourth end member, and a second modular member coupled therebetween, wherein each of said first and second modular members comprise a groove configured to operatively receive a portion of said electrical conductor, and wherein said electrical conductor is secured within said grooves between said first and second modular members.

13. The electrical conductor support system of claim 12, further comprising a second electrical conductor, a third modular member and a fourth modular member, wherein said first and third modular members are coupled between said first and second end members and said second and fourth modular members are coupled between said third and fourth end members, wherein said second electrical conductor is supported between said third and fourth modular members and spaced apart from said first electrical conductor.

14. The electrical conductor support system of claim 13, further comprising a third electrical conductor, a fifth modular member and a sixth modular member, wherein said fifth modular member is coupled between said first and third modular members and said sixth modular member is coupled between said second and fourth modular members, wherein said third electrical conductor is supported between said fifth and sixth modular members and spaced apart from said first and second electrical conductors.

15. The electrical conductor support system of claim 12, wherein said first and second modular members are coupled between said first and second end members and said third and fourth end members, respectively, by a snap-fit connection.

16. The electrical conductor support system of claim 12, wherein said first, second, third and fourth end members each comprise a sidewall including a projection and a recess.

17. The electrical conductor support system of claim 16, wherein said first and second modular members each comprise first and second opposed sidewalls, said first and second sidewalls each including a projection and a recess, wherein said projection of said modular member first and second sidewalls is configured to operatively mate with said recess of any of said first, second, third and fourth end member sidewalls, and said recess of said modular member first and second sidewalls is configured to operatively mate with said projection of any of said first, second, third and fourth end member sidewalls.

18. The electrical conductor support system of claim 12, wherein said end members and said modular members are molded plastic, and wherein said end members are substantially identical and said modular members are substantially identical.

19. A method of assembling an electrical conductor support system comprising:
   providing opposed first and second support rails;
   providing a plurality of end members;
   providing a plurality of modular members having a groove formed therein;
   coupling a pair of end members to each of the first and second support rails such that each pair of end members is opposite the other;
   coupling at least one modular member of the plurality of modular members between each pair of end members to provide a pair of opposite modular members, the grooves of each modular member being substantially aligned;
   positioning an electrical conductor in each groove of the pair of opposed modular members to support the electrical conductor.

20. The method of claim 19, wherein the step of coupling at least one modular member between each pair of end members comprises coupling three modular members of the plurality of modular members between each pair of end members to provide three pairs of opposed modular members, the grooves of each pair of opposite modular members being aligned.

* * * * *

UNITED STATES PATENT AND TRADEMARK OFFICE
CERTIFICATE OF CORRECTION

| | | |
|---|---|---|
| PATENT NO. | : 8,921,701 B2 | Page 1 of 1 |
| APPLICATION NO. | : 13/602605 | |
| DATED | : December 30, 2014 | |
| INVENTOR(S) | : Lejawka et al. | |

It is certified that error appears in the above-identified patent and that said Letters Patent is hereby corrected as shown below:

Title page, Item (73), under "Assignee", in Column 1, Line 1, delete "General Electric Copany," and insert -- General Electric Company, --, therefor.

Specification

In Column 2, Line 7, delete "is" and insert -- is a --, therefor.

Claims

In Column 6, Line 13, in Claim 11, delete "second-end" and insert -- second end --, therefor.

Signed and Sealed this
Twenty-seventh Day of October, 2015

Michelle K. Lee
*Director of the United States Patent and Trademark Office*